United States Patent [19]

Freeman et al.

[11] Patent Number: 4,955,976
[45] Date of Patent: Sep. 11, 1990

[54] OPTICAL FIBER CONNECTOR

[75] Inventors: Lucius J. Freeman, Hartwell; Paul F. Gagen, Duluth, both of Ga.

[73] Assignee: AT&T Bell Laboratories, Murray Hill, N.J.

[21] Appl. No.: 335,318

[22] Filed: Jun. 14, 1989

Related U.S. Application Data

[60] Division of Ser. No. 232,516, Aug. 15, 1988, Pat. No. 4,856,866, which is a continuation of Ser. No. 912,021, Sep. 29, 1986, abandoned.

[51] Int. Cl.$^5$ ............................................. G02B 6/38
[52] U.S. Cl. .................................. 350/96.21; 350/96.2
[58] Field of Search .................. 350/96.2, 96.21, 96.22

[56] References Cited

U.S. PATENT DOCUMENTS

| 4,205,898 | 6/1980 | Matthews et al. | 350/96.21 |
|---|---|---|---|
| 4,274,708 | 6/1981 | Cocito et al. | 350/96.21 |
| 4,353,619 | 10/1981 | Parr | 350/96.21 |
| 4,470,180 | 9/1984 | Blomgren | 24/563 |
| 4,541,685 | 9/1985 | Anderson | 350/96.21 |
| 4,545,644 | 10/1985 | DeVeau, Jr. et al. | 350/96.21 |
| 4,691,986 | 9/1987 | Aberson, Jr. et al. | 350/96.21 |
| 4,856,866 | 8/1989 | Freeman et al. | 350/96.2 |

FOREIGN PATENT DOCUMENTS

| 60-247204 | 6/1985 | Japan . |
|---|---|---|
| 1520679 | 2/1977 | United Kingdom . |
| 2022284 | 12/1979 | United Kingdom . |

OTHER PUBLICATIONS

"Fiber-Optic Splicing Tool", by L. Balliet and O. R. Gupta, *IBM Technical Disclosure Bulletin*, vol. 25, No. 7A, Dec. 1982.

*Primary Examiner*—William L. Sikes
*Assistant Examiner*—John Ngo
*Attorney, Agent, or Firm*—E. E. Pacher

[57] ABSTRACT

Disclosed are aligned plug optical fiber connectors. A preferred embodiment of the inventive connector comprises two cylindrical glass plugs, a glass alignment block of L-shaped cross-section, and a bifurcated metal spring clip that separately urges each plug against the two reference surfaces formed by the arms of the alignment block. The presence of a recessed portion of one of the reference surfaces is optional and can facilitate rotational tuning of the fiber connector.

5 Claims, 4 Drawing Sheets

OPTICAL FIBER CONNECTOR

CROSS REFERENCE TO RELATED APPLICATION

This application is a division of application, Ser. No. 07/232,516, filed Aug. 15, 1988, which is a continuation of application, Ser. No. 912,021, filed Sept. 29, 1986, now abandoned, now U.S. Pat. No. 4,856,866.

FIELD OF THE INVENTION

This invention pertains to optical fiber connecting means comprising fiber-to-fiber mating means.

BACKGROUND OF THE INVENTION

Optical fiber connectors and splices (hereinafter referred to collectively as "connectors") are an essential part of substantially any optical fiber communication system. For instance, connectors may be used to join segments of fiber into long lengths, or to connect fiber to active devices such as radiation sources, detectors or repeaters, or to passive devices such as switches or attenuators.

One commercially significant connector type can be generically described as comprising first and second tubular means (to be referred to herein as first and second "plugs") adapted for receiving in the bore thereof an end of an optical fiber, and means for maintaining the first and second plugs radially aligned such that the cores of the respective optical fibers in the plugs are substantially aligned. Connectors of this type will be referred to herein as "aligned plug" (AP) connectors. AP connectors typically comprise means for maintaining the fiber ends longitudinally essentially fixed relative to each other. Typically, the first and second plugs are cylindrical, with the axis of the longitudinal bore substantially coinciding with the axis of the cylindrical plug. Furthermore, the means for maintaining the plugs radially aligned are in contact with the outer cylinder surfaces of the respective plugs, and the connector is without provision for varying the radial position of the optical fiber core relative to the axis of the plug wherein the fiber is held.

Examples of such connectors are disclosed, for instance, in U.S. Pat. No. 4,541,685; U.S. patent application Ser. No. 527,341, filed Aug. 29, 1983, by T. D. Mathis and C. M. Miller; U.S. Pat. No. 4,545,644; and U.S. patent application, Ser. No. 795,483, filed Nov. 6, 1985, by J. A. Aberson, Jr. et al., all co-assigned with this.

The '685 patent discloses a connector comprising two cylindrical plugs and an alignment sleeve. AP connectors of this type, in which the alignment means circumferentially surround, or at least substantially surround, the two plugs, will be referred to as "plug-and-sleeve" connectors. The '341 patent application teaches, inter alia that glass plugs can advantageously be used in plug-and-sleeve connectors. The '644 patent discloses a connector wherein the alignment means comprise cylindrical alignment rods, with typically two of the alignment rods carrying a "flat" extending from one end of the rod to approximately the middle of the rod, whereby exact fiber core alignment can be achieved by rotation of one plug relative to the other. The alignment rods are maintained in contact with the plugs by appropriate means such as a substantially triangular flexible fixture. The '483 patent application teaches that "contiguous" glass plugs can be advantageously used in connectors of the plug-and-sleeve type, where by "contiguous" plugs are meant plugs that have occupied adjacent positions in the glass preform rod from which they are cut. The use of contiguous plugs reduces or eliminates differences in the eccentricity of the bore relative to the cylinder surface of the plugs, resulting in improved fiber core alignment. The '483 application also discloses a "corrugated tube" alignment sleeve that can advantageously be used in plug and sleeve-type connectors.

AP connectors typically require the use of two plugs of essentially identical diameter to obtain a stable low loss connection, and to insure approximately equal and adequate holding force on both plugs. For instance, if in a prior art plug-and-sleeve type connector, such as shown in the '685 patent, plugs that differ significantly in outside diameter are used, the sleeve cannot properly grip the smaller plug, resulting, inter alia, in possible tilt or other misalignment of the fiber cores as well as in possibly inadequate retaining force on the smaller plug. This occurs because the two halves of the sleeve are tightly coupled with respect to radial deformation. By this we mean that radial extension of one sleeve half, e.g., by insertion of a plug into the sleeve, leads to an analogous radial extension (of the same type, and of similar but not necessarily of exactly the same magnitude) of the other sleeve half.

Reduced mechanical and thermal stability of the connection as well as, typically, increased optical loss would result also in other AP connectors if plugs of substantially different outer diameter were mated. For instance, in one commercially available AP single mode fiber connector that uses glass plugs and glass alignment rods, specifications call for the outside diameters of the two mating plugs to be equal to within about 1 $\mu$m. Maintenance of such close tolerances involves manufacturing costs that would not be present if this specification could be relaxed.

At least in some prior art AP connectors, e.g., in plug-and-sleeve type connectors, it not only is necessary that the pair of plugs be closely matched with respect to their outside diameter but also that the diameter of the matched plugs be kept within relatively narrow limits, in order to achieve stable optical coupling. For instance, in one commercially available plug-and-sleeve type connector (of construction similar to that disclosed in the above referred to '341 patent application) the permitted variation in plug diameter is about $\pm 6$ $\mu$m. Use of plugs with diameters outside this range (even if the two plugs are matched) results in relatively poor gripping and/or alignment of the plugs by the sleeve, or overstressing of the sleeve, and, consequently, in unstable mechanical and optical coupling between the fibers.

As will undoubtedly be appreciated by those skilled in the art, a piece part having one or more dimensions with close tolerances is more costly to manufacture than it would be to manufacture the same part with larger tolerances. Thus, significant cost reduction could be attained with alignment sleeves capable of accommodating a greater range of plug diameter.

In view of the economic advantages and possible improved performance that would result if current tight tolerances on the outside diameters of plugs to be used in AP connectors could be relaxed, AP fiber connectors able to accommodate plug pairs whose members differ in outside diameter by more than is acceptable in analogous prior art connectors, and/or that can accommodate a substantially greater range of plug diameters than is possible with prior art AP connectors, would be of substantial interest. This application discloses such connectors.

GLOSSARY AND DEFINITIONS

A "plug" herein is a cylindrical piece part, having an axial bore, an outer cylinder surface, and two end faces. The end of an optical fiber is inserted into the bore and held therein by adhesive or other appropriate means, such that the fiber end extends beyond the plug. The assemblage is then prepared such that the fiber end is essentially flush with the free end face of the plug.

An "AP connector" comprises two plugs, prepared as above, maintained by radial alignment means such that the cylinder axes of the respective plugs are essentially collinear, and maintained further such that the two free end faces are in essentially fixed longitudinal relationship relative to each other. The free end faces can be in direct contact, or index matching means can be present therebetween. The radial alignment means act directly on the outer cylinder surface of the respective plugs. In AP connectors according to the invention, the radial alignment means have two "halves" (not necessarily of equal length or the same physical orientation).

Radial alignment means are "bilaterally decoupled" or "longitudinally decoupled" if radial deformation of one half of the alignment means does not produce an analogous radial deformation of the other half. A radial deformation of one half is considered to be non-analogous to that of the other half if, inter alia, the magnitude of the two deformations is substantially different (typically by at least about 30%), or if the nature of the two deformations differs with respect to the two plugs to be aligned. For examples of bilaterally decoupled radial alignment means see, for instance, FIGS. 1 and 4-12.

A "limited-contact" radial alignment means are radial alignment means is shaped such that only a limited portion (typically less than 50%) of the outer cylinder surface of a plug is in contact with the inner surface of the alignment means, with the remainder of the outer cylinder surface being spaced from the inner surface.

An "alignment sleeve" is a basically tubular piece part adapted for receiving therein two plugs and for maintaining the two plugs in radial alignment.

An "extension-contraction" (EC) limited contact alignment sleeve is an alignment sleeve, typically having two-fold rotational symmetry about the longitudinal axis of the sleeve, in which extension of the sleeve in one radial direction results in contraction of the sleeve typically of magnitude comparable to that of the extension in another radial direction. For examples of EC limited contact alignment sleeves see, for instance, FIGS. 7-11.

SUMMARY OF THE INVENTION

It is an object of this invention to provide AP optical fiber connectors that can accommodate pairs of plugs, the members of which have outer diameters that can differ by more than is acceptable in analogous prior art AP-type connectors, typically by more than 1 or even 10 μm. This will be referred to herein as the "first objective".

It is also an object of the invention to provide AP connectors that can accommodate a wider range (typically greater than ±10 or even ±30 μm) of plug diameters than is acceptable in prior art AP connectors. This will be referred to herein as the "second objective".

It is also an object of the invention to provide AP connectors that meet both the first and the second objective. Disclosed are also rotationally tunable AP connectors that can meet the first and/or the second objective.

The first objective is met by providing AP connectors comprising bilaterally decoupled radial alignment means. The decoupling can be achieved, for instance, by means of one or more lateral slits at or near the longitudinal midpoint of the alignment means. In plug-and-sleeve connectors, the alignment sleeve comprises the lateral slit(s), whereas in other AP connectors it is typically a compliant member (that serves to hold the plugs in contact with at least two alignment surfaces) that comprises the lateral slit(s). Bilateral decoupling can also be achieved by other means, e.g., by provision of an EC limited contact alignment sleeve in which one half is rotationally offset with respect to the other.

The second objective can be met, inter alia, by providing plug-and-sleeve connectors comprising an EC limited-contact alignment sleeve.

Finally, an AP connector that meets the first and second objectives comprises a bilaterally decoupled EC limited-contact alignment sleeve, or by other, suitably designed, bilaterally decoupled limited contact radial alignment means.

Insertion of a plug into an EC limited-contact alignment sleeve (see, for instance, FIG. 7) can result in radial extension of the sleeve in the contact region(s), accompanied by a general flexing of the sleeve and a radial contraction in the non-contact region(s). The ability to allow a general flexing and to contract radially, which is not present to a significant degree in prior art sleeves, including the above referred to "corrugated tube" sleeve, allows accommodation of a wider range of plug sizes than can be accommodated with prior art sleeves.

An EC limited-contact sleeve in which the two halves typically have substantially identical cross-section, but with one half rotationally offset (typically by 90°) with respect to the other half, is bilaterally decoupled, since the plug-caused radial extension in the contact region of one sleeve half causes a nonanalogous radial deformation in the other sleeve half. In particular, such a radial extension causes a radial contraction in the contact region of the other half, resulting in improved gripping of the smaller plug, as compared to that obtainable in prior art alignment sleeves.

DETAILED DESCRIPTION OF PREFERRED EMBODIMENTS

Figure 1:
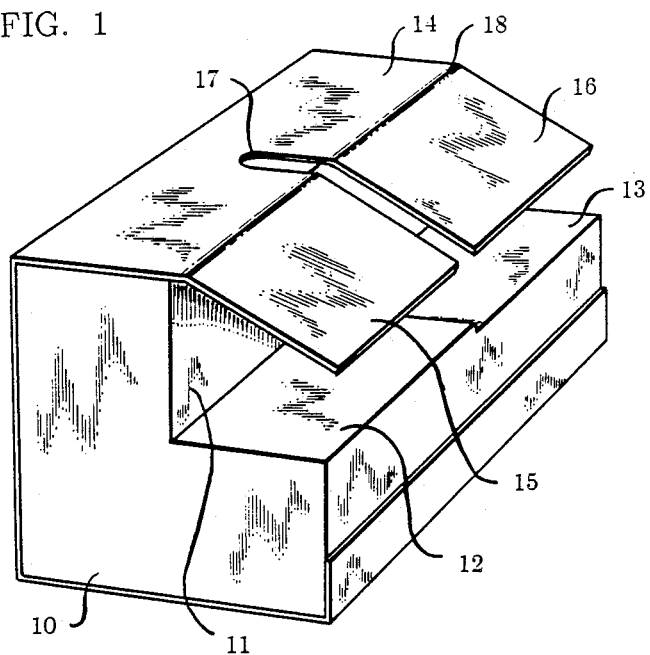
FIG. 1 is a perspective view of the radial alignment means of an exemplary AP-type connector according to the invention.

FIG. 1 schematically shows the relevant portion of a currently preferred embodiment of an optical fiber connector according to the invention, namely, an AP connector, adapted for rotary core alignment, that meets the first and second objectives. In FIG. 1, reference numeral 10 refers to a block of substantially L-shaped cross section (advantageously glass, steel or other relatively non-compliant material), and 14 to compliant means (e.g., an appropriately shaped beryllium copper spring clip) that serve to maintain the two plugs in contact with the reference surfaces. Reference surface 11 is shown to be (but need not be) recess-free. The other reference surface of the L-block is shown to comprise a portion 13 that is recessed with respect to portion 12. The amount of recess shown in FIG. 1, as well as in other figures, is not to scale. In an actual connector, the recess exemplarily is of the order of 1-10 μm, and can easily be produced by known means, e.g., by sandblasting. The included angle defined by the reference surfaces is shown to be 90°. However, as will be appreciated by those skilled in the art, this is exemplarily only, and at least, in principle, the included angle can be any angle less than 180°.

The compliant means 14 is shown to be bifurcated by means of a slit 17, thereby defining the two halves of the alignment means and creating tabs 15 and 16, resulting in bilateral decoupling of the two halves of the alignment means. The length of slit 17 depends on individual requirements. For instance, the slit could extend only part of the way to edge 18, it can extend beyond edge 18 as shown, or, in principle, it can extend the full peripheral length of 14, such that 14 would consist of two independent but substantially identical spring clips. Tabs 15 and 16 advantageously are bent out of the horizontal plane (thereby forming edge 18) to an extent such that, after insertion of a plug, the plug exerts approximately equal forces on alignment surfaces 11 and 12 (or 11 and 13). Typically, the dividing step between surfaces 12 and 13 is positioned such that the two surfaces are of substantially equal length, or possibly that 13 is somewhat longer than 12, such that plugs of equal length can be accommodated symmetrically.

It will be appreciated that the recess is optional, and that the connector meets the first and second objectives with or without the recess. Even rotary alignment of the fiber cores is possible in many cases without a recess, but the presence of an appropriate recess generally makes possible rotational core alignment for a wider range of eccentricities (of the fiber core relative to the cylinder axis of the plug).

Figure 2:
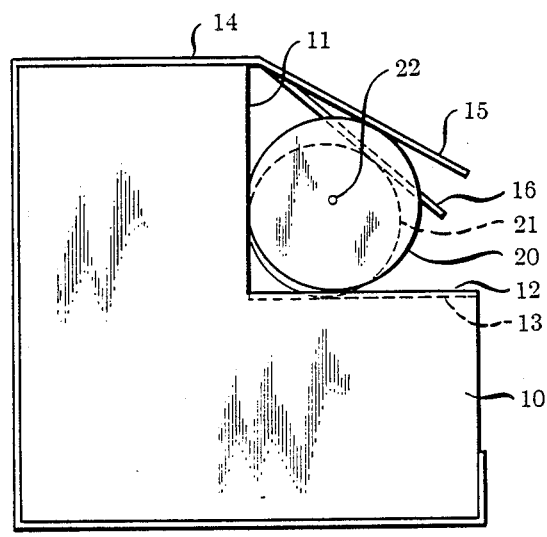
FIGS. 2 and 3, respectively, depict a schematic end view and a schematic exploded perspective view of the exemplary inventive connector.

FIG. 2 shows schematically the preferred embodiment of the inventive connector in end view, with plugs 20 and 21 in position. As depicted in FIG. 2, plug 20 is in contact with reference surfaces 11 and 12 and is maintained in this position by means of tab 15, and plug 21 is in contact with reference surfaces 11 and 13 and is maintained in this position by means of tab 16. Reference numeral 22 refers to the axial bore of plug 20. After insertion of the appropriately prepared plugs into the alignment means, one plug can be rotated with respect to the other until maximum fiber-to-fiber optical coupling is achieved. The aligned plugs can then be fixed in position by adhesive means. However, in the currently preferred embodiment, the plugs are maintained in position solely by means of the elastic forces exerted by the tabs on the plugs. Index matching material optionally can be present in the interface between the two plugs.

Figure 3:
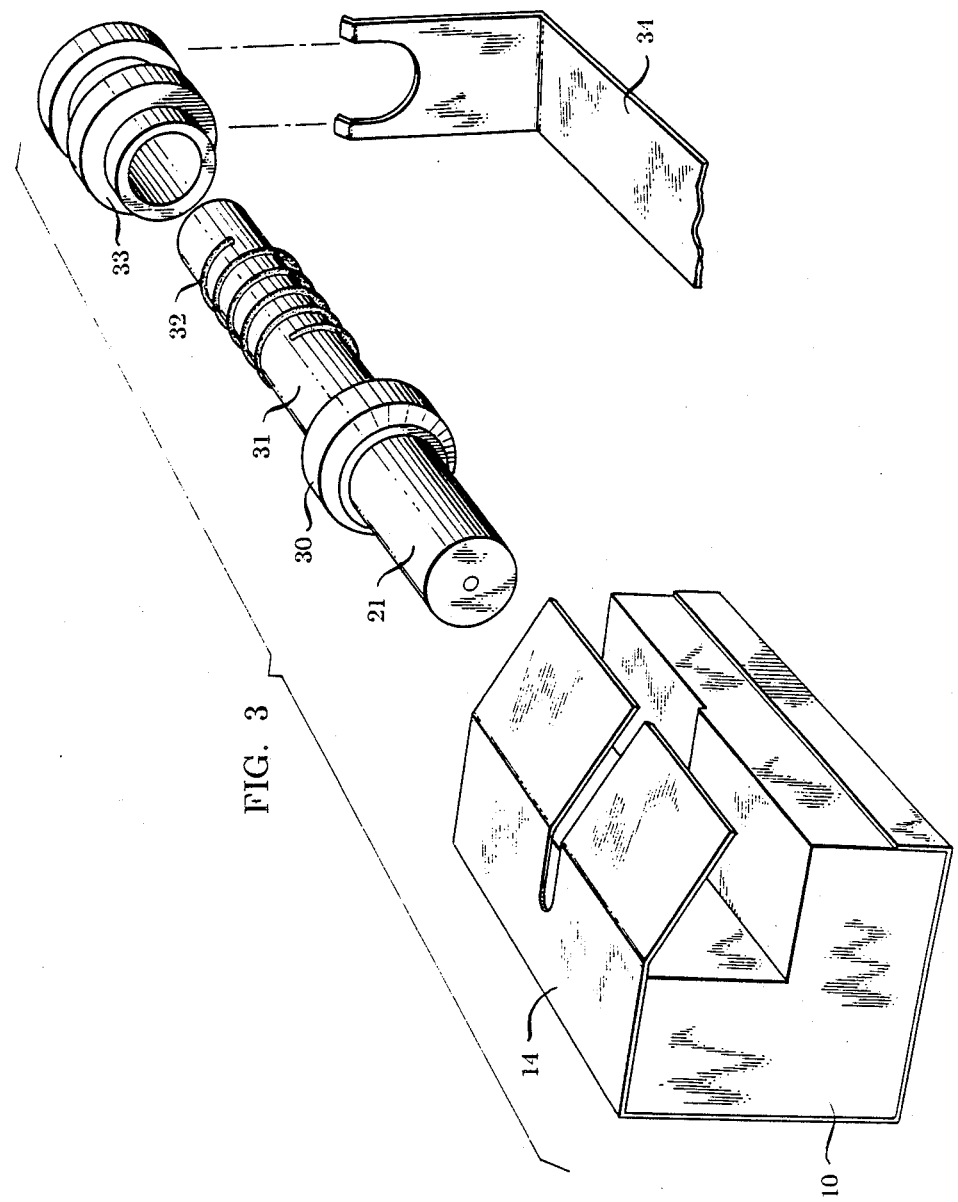

FIG. 3 shows schematically, in exploded perspective view, a portion of the exemplary preferred connector. The connector comprises, in addition to previously discussed L-block 10 and spring clip 14, two glass plugs (of which only plug 21 is shown). The plug is held (e.g., adhesively or by means of a press-fit) in a bushing 30. Integral with the bushing is a barrel 31 over which spring 32 fits. Grooved collar 33 slides onto 31 and serves to retain 32. It also engages optional U-shaped mounting clip 34.

The fiber termination is prepared by removing the coating from the end portion of a coated optical fiber, threading the fiber through the bore of bushing 30 and the bore of plug 21 and fixing the fiber adhesively or by other suitable means to the plug and the bushing such that the fiber end extends into 31. The protruding bare fiber is then scribed, broken, and polished by known means such as to be flush with the free end face of the plug. After similarly preparing the second fiber termination, tabs 15 and 16 are raised sufficiently (advantageously by means of appropriately shaped pliers) such that the two plugs can be inserted, with each plug being in contact with only one of the tabs. After optimizing the alignment of the two fiber cores by rotating one plug relative to the other, the assembly can be inserted into the mounting clip, which can comprise means for attaching the assembled fiber connector to a connector board or other appropriate holding means (not shown). Furthermore, other means for mounting and/or exerting an inward directed axial force on the plugs are possible and can be used, as will be appreciated by those skilled in the art.

In the currently preferred embodiment, the glass plugs and the L-block are PYREX, the spring clip 14 is formed from Be-Cu stock, and bushing 30, barrel 31, and collar 33 are molded plastic. The offset in the L-block is typically $\leq 8$ μm, typically permitting core alignment when the total eccentricity (plug axis relative to bore axis, fiber axis relative to bore axis, and core axis relative to fiber axis) does not substantially exceed 8 μm. Although in the currently preferred embodiment of the invention, the L-block 10 is a glass block, it can, in principle, consist of any desired low compliance material and be prepared by any appropriate method. For instance, 10 can be a molded polymer block or a machined metal block. However, due to the close match of mechanical and thermal properties that can exist between a glass block 10 and glass plugs 20 and 21, we currently prefer this combination of materials.

Figure 4:
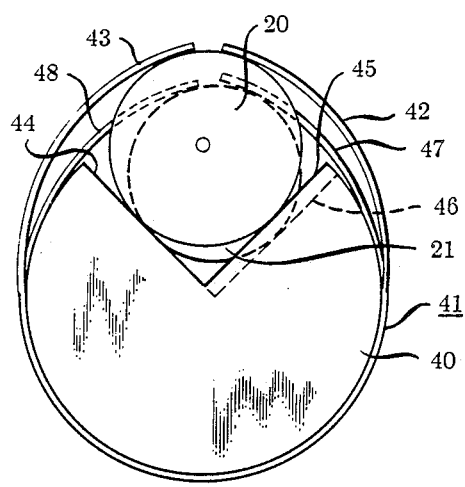
FIGS. 4 and 5 are schematic end views of different embodiments of the invention.
Figure 5:
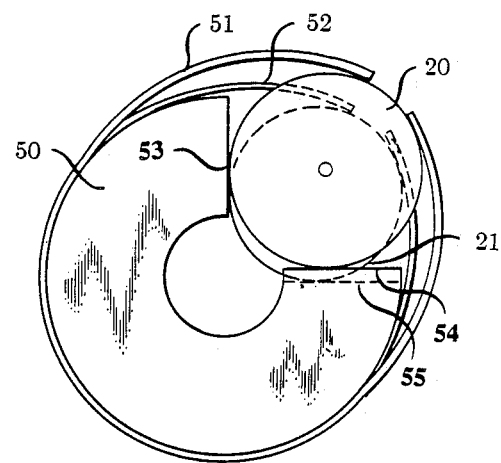

FIGS. 4 and 5 schematically show in end view alternative embodiments of the inventive connector. In particular, alignment block 40 of FIG. 4 has basically circular cross-section, with a sector removed so as to provide two reference surfaces. As depicted, reference surface 44 is recess-free, whereas the other reference surface comprises a recessed portion 46 and a non-recessed portion 45, thereby facilitating rotational core alignment. Plug 20 is in contact with surfaces 44 and 45, whereas plug 21 is in contact with surfaces 44 and 46.

Circumferential spring clip 41 contains two slits such that tabs 42 and 47 and 43 and 48 are formed, with tabs 42 and 43 being in contact with plug 20, whereas tabs 47 and 48 are in contact with plug 21.

FIG. 5 depicts a connector comprising tubular alignment block 50 from which a sector is removed such as to form alignment surfaces 52 through 54. The alignment means comprise two separate spring slips 51 and 52, with 51 gripping plug 20 only, and 52 gripping plug 21 only. As will be obvious to those skilled in the art, the spring clips of FIGS. 4 and 5 could be used interchangeably.

It will also be appreciated by those skilled in the art that AP connectors as shown in FIGS. 1-5 can have recessed portions in one or both reference surfaces or have no recess at all. However, since, in the last case, rotational core alignment may not be attainable for some combinations of plugs (depending on eccentricities), it may be advantageous to have available recess-free as well as recessed alignment blocks.

Figure 6:
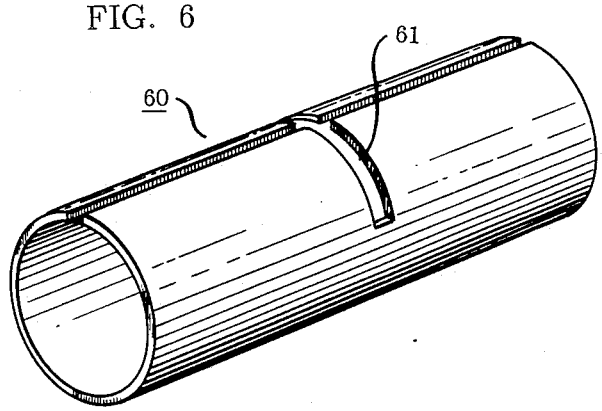
FIG. 6 shows a schematic perspective view of a bilaterally decoupled longitudinally split alignment sleeve that can be used in a plug-and-sleeve type connector of the type disclosed in the '685 patent.

FIG. 6 shows a bilaterally decoupled longitudinally split alignment sleeve 60 for use in a plug-and-sleeve connector that meets the first objective. Decoupling is provided through lateral slit 61.

Figure 7:
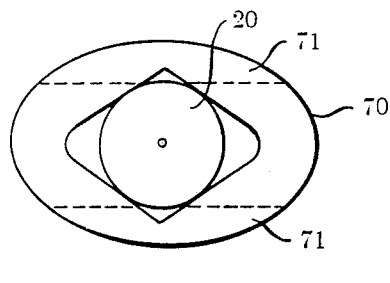
FIGS. 7 and 8 depict schematically in end view exemplary bilaterally decoupled EC limited contact alignment sleeves.
Figure 8:
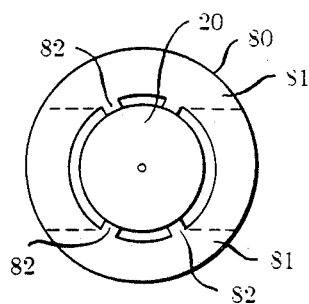

FIGS. 7 and 8 schematically depict in end view connectors of the plug-and-sleeve type that meet both the first and second objectives, the former by means of lateral slits (71 and 81, respectively), the latter because the sleeves are EC limited-contact sleeves. It will be appreciated that alignment sleeves, e.g., sleeves of the type shown in FIGS. 7 and 8, can also comprise recesses to facilitate rotational alignments, and that EC limited-contact sleeves could also be provided without lateral slits or other decoupling means (in which case they would meet the second objective).

Figure 9:
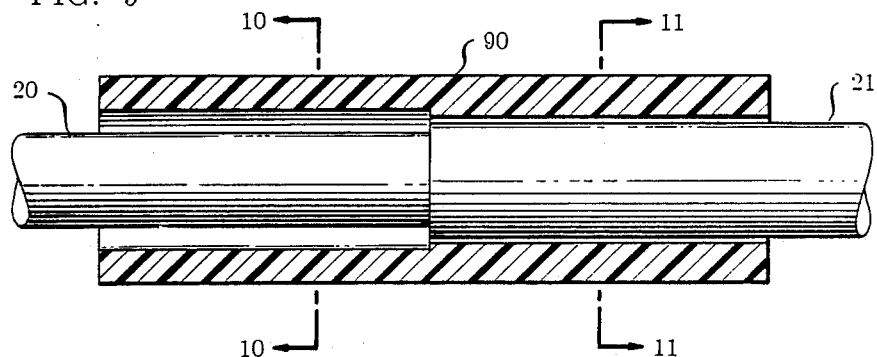
FIG. 9 shows schematically in side view an inventive plug-and-sleeve connector with plugs of unequal outer diameter.
Figure 10:
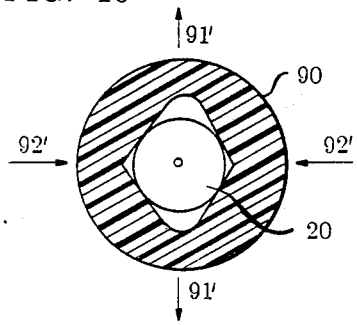
FIGS. 10 and 11 show two sectional views of the connector of FIG. 9.
Figure 11:
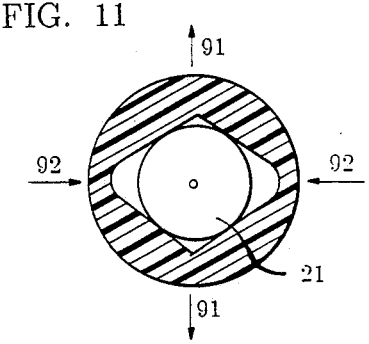

FIGS. 9-11 illustrate a plug-in-sleeve connector that also attains both objectives, but achieves the first objective without the use of lateral slits. In particular, sleeve 90 is an EC limited contact sleeve, with one half of the sleeve rotated by 90° with respect to the other, as can be seen from FIGS. 10 and 11. Insertion of plug 21 (which is, exemplarily, shown to be larger than plug 20) into the right half of 90 leads to deformation of 90, as indicated by means of arrows 91 and 92 in FIG. 11. The insertion of 21 also leads to deformation 91' and 92' of the left half of 90, as indicated in FIG. 10. Radial contraction 92' results in additional gripping force on plug 20. A similar result can be obtained by appropriately rotationally offsetting the two halves of other EC limited contact sleeves, e.g., a sleeve of the type depicted in FIG. 8.

Figure 12:
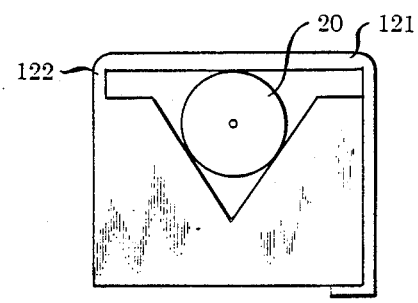
FIG. 12 schematically shows a further embodiment of an AP connector according to the invention.

FIG. 12 schematically depicts another embodiment of an AP connector according to the invention, wherein 120 is a molded block with a longitudinal V-groove, and yoke 121, connected to 120 by means of living hinge 122, serves to maintain plugs 20 and 21 (the latter not shown) in contact with the V-groove planes. Obviously, one or both of the V-groove planes can comprise a recessed portion, and yoke 121 can be bifurcated or unitary.

As will be appreciated by those skilled in the art, the principles disclosed herein are of broad applicability in the field of optical fiber connectors, and can be embodied in a variety of specific designs, of which the above disclosed designs are only exemplary.

We claim:

1. An optical fiber connector comprising
  (a) a first and a second cylindrical plug, the first and second plug each having an outer diameter, an axis, a cylinder surface, an end face and a longitudinal bore adapted for receiving therein a portion of the first and second optical fiber, respectively, the fiber to be fixed in the respective bore, the bore having an axis that is essentially coincident with the axis of the respective plug;
  (b) alignment means for maintaining the first and second plugs aligned such that the axis of the first plug is substantially collinear with the axis of the second plug, with opposed plug end faces, the alignment means contacting the first and second plug cylinder surfaces and comprising spring clip means having two (not necessarily identical) halves, wherein
    (i) the alignment means comprise an alignment block having two arms and being of basically L-shaped cross section and adapted for receiving the plugs in the space defined by the arms; and
    (ii) the spring clip means are adapted for urging the first and second plugs into the space defined by the two arms of the alignment block, and at least partially circumferentially surround at least a portion of the alignment block and extend over at least a part of the space defined by the two arms of the alignment block, and furthermore comprise a transverse slit that defines the two halves, with one half of the spring clip to urge the first plug and the other half to urge the second plug.

2. The connector of claim 1, wherein the two arms comprises an alignment surface that comprises a recessed portion and a non-recessed portion essentially parallel with the recessed portion.

3. The connector of claim 1, wherein the alignment block is a glass block, and the spring clip is a metal spring clip.

4. The connector of claim 1, further comprising means for urging the end face of the first plug towards the end face of the second plug.

5. The connector of claim 1, wherein the first and second plugs are glass plugs.

* * * * *